United States Patent [19]
Hicks et al.

[11] 3,847,416
[45] Nov. 12, 1974

[54] HYDRAULIC CONTROL CIRCUIT WITH REMOTELY CONTROLLED DUAL PRESSURE RELIEF VALVE

[75] Inventors: Leon E. Hicks, Joliet; John W. Grant, Pekin; Loyal O. Watts, Mapleton; Wayne A. Peterson, Joliet, all of Ill.

[73] Assignee: Caterpillar Tractor Co., Peoria, Ill.

[22] Filed: Nov. 2, 1973

[21] Appl. No.: 412,452

[52] U.S. Cl. ............................. 280/481, 280/491 R
[51] Int. Cl. ............................................. B60d 1/00
[58] Field of Search ............ 280/477, 478 R, 479 R, 280/481

[56] References Cited
UNITED STATES PATENTS

| | | | |
|---|---|---|---|
| 3,160,076 | 12/1964 | Martin | 60/427 X |
| 3,416,561 | 12/1968 | Kokaly | 91/451 X |
| 3,434,738 | 3/1969 | Campbell et al. | 280/477 |
| 3,469,861 | 9/1969 | Schexayder | 280/479 R |
| 3,618,984 | 11/1971 | Cook | 280/481 |

Primary Examiner—Leo Friaglia
Assistant Examiner—Randall A. Schrecengost
Attorney, Agent, or Firm—Phillips, Moore, Weissenberger, Lempio & Strabala

[57] ABSTRACT

Multiple embodiments of a hydraulic control circuit for a double-acting hydraulic motor to provide fluid at a relatively high pressure for operating the motor in a selected direction and otherwise providing operating fluid to the motor at a relatively low pressure, the control circuit including a dual pressure relief valve which is operatively responsive to the motor or an implement positioned by the motor to provide the two operating pressures. An additional dual pressure relief valve regulates the flow of exhaust fluid from one side of the motor to allow controlled response of the motor to external forces. The hydraulic control circuit of the present invention is preferably contemplated for operating a push-pull coupling to permit selective tandem operation of two vehicles.

13 Claims, 6 Drawing Figures

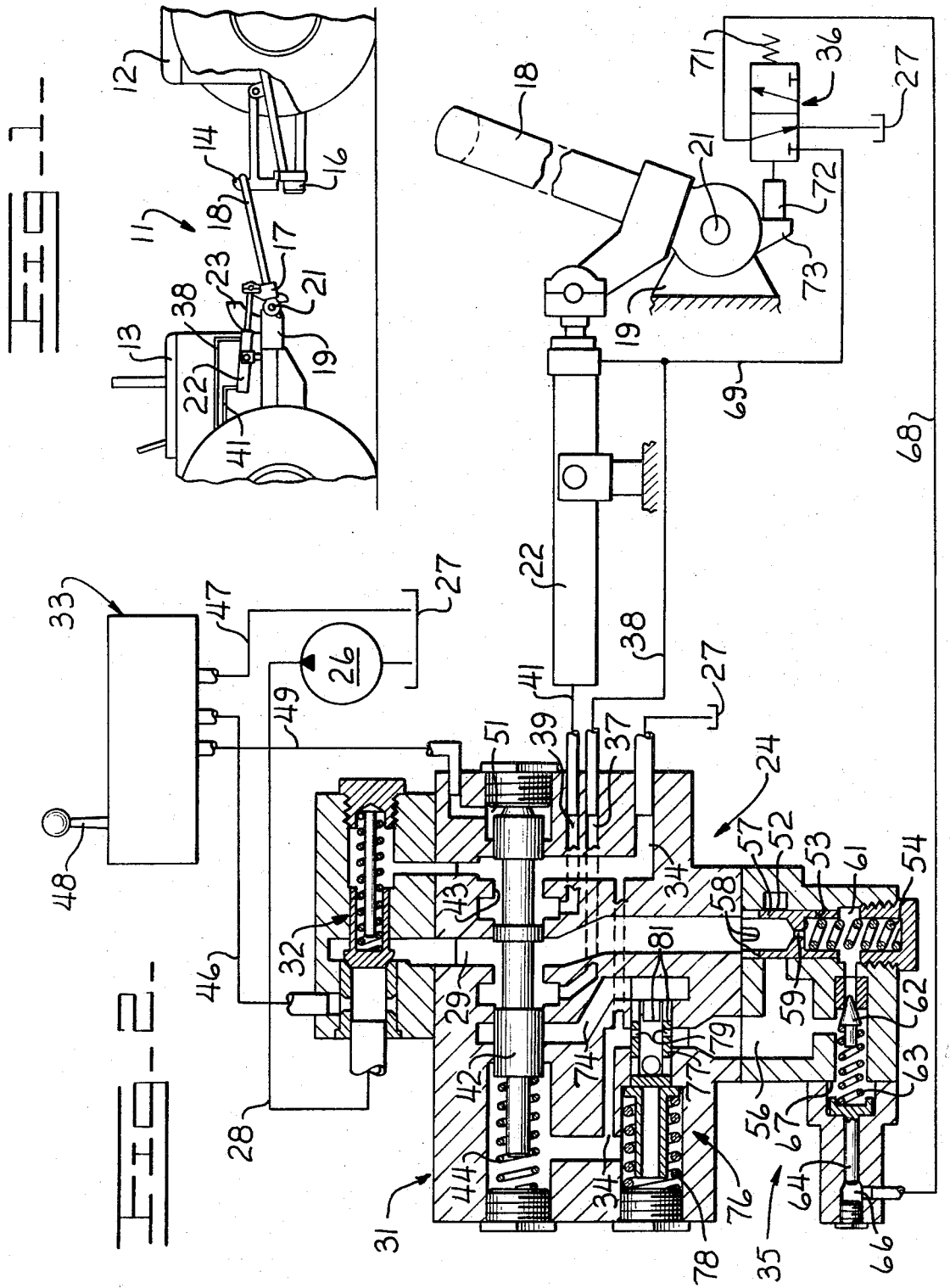

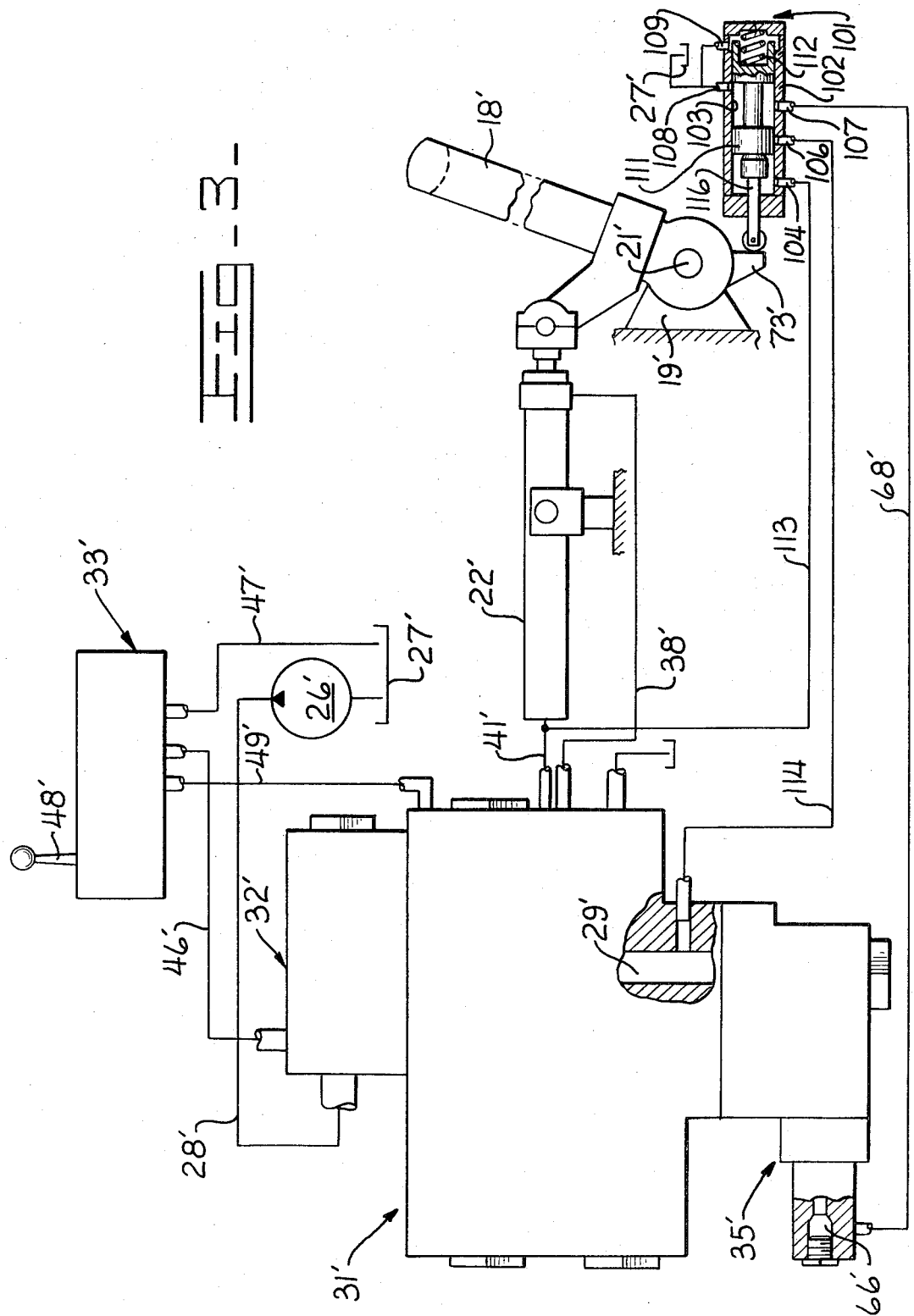

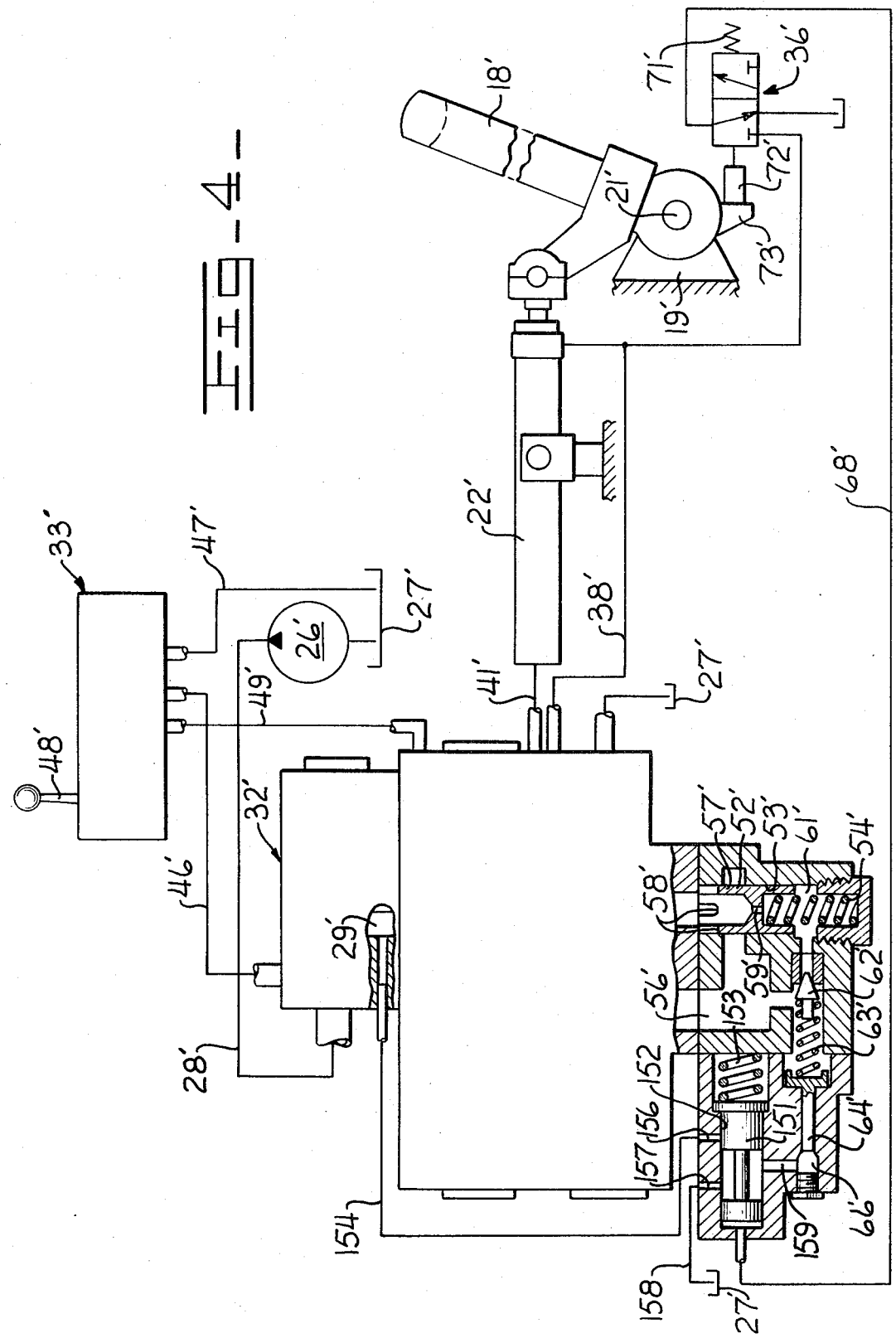

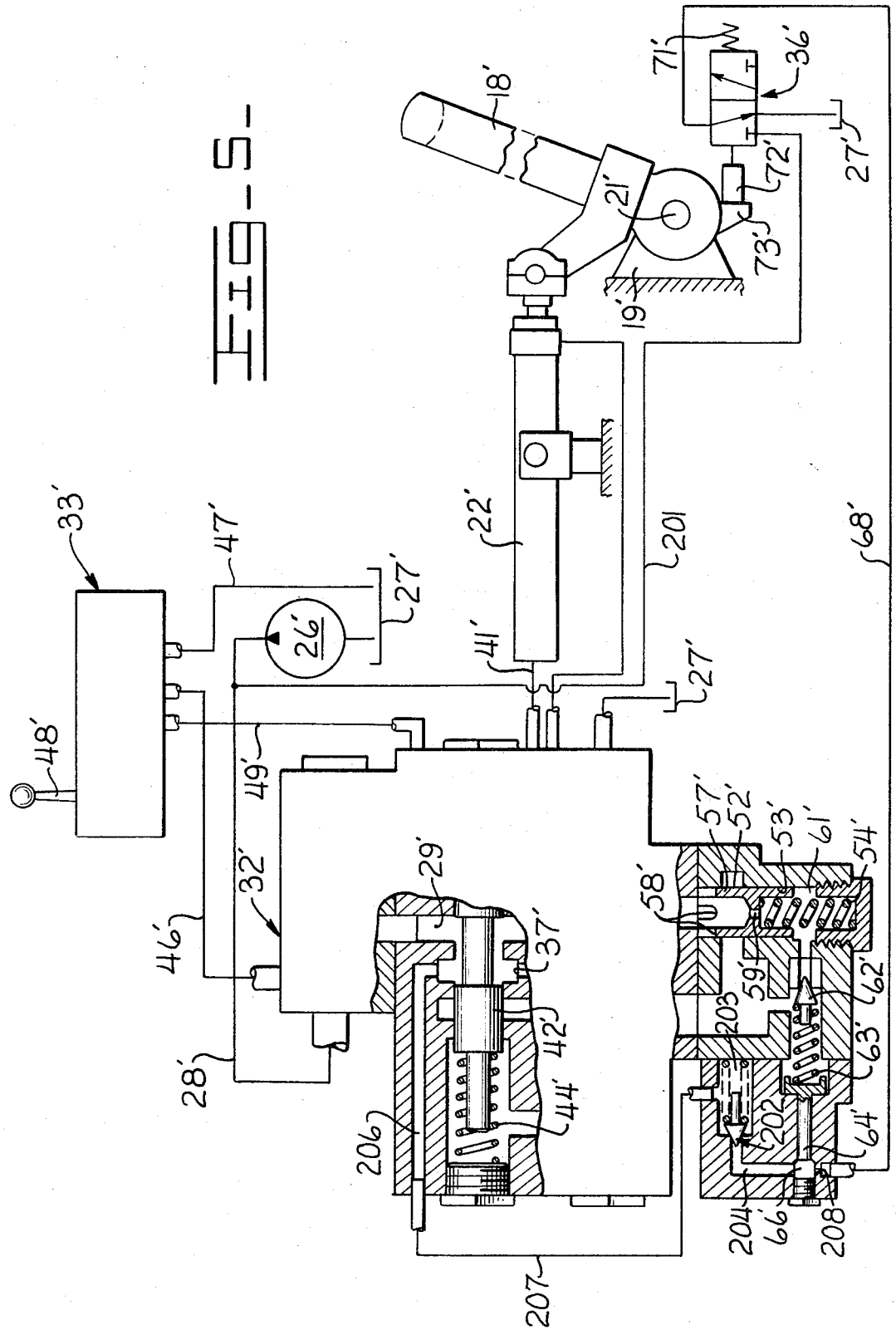

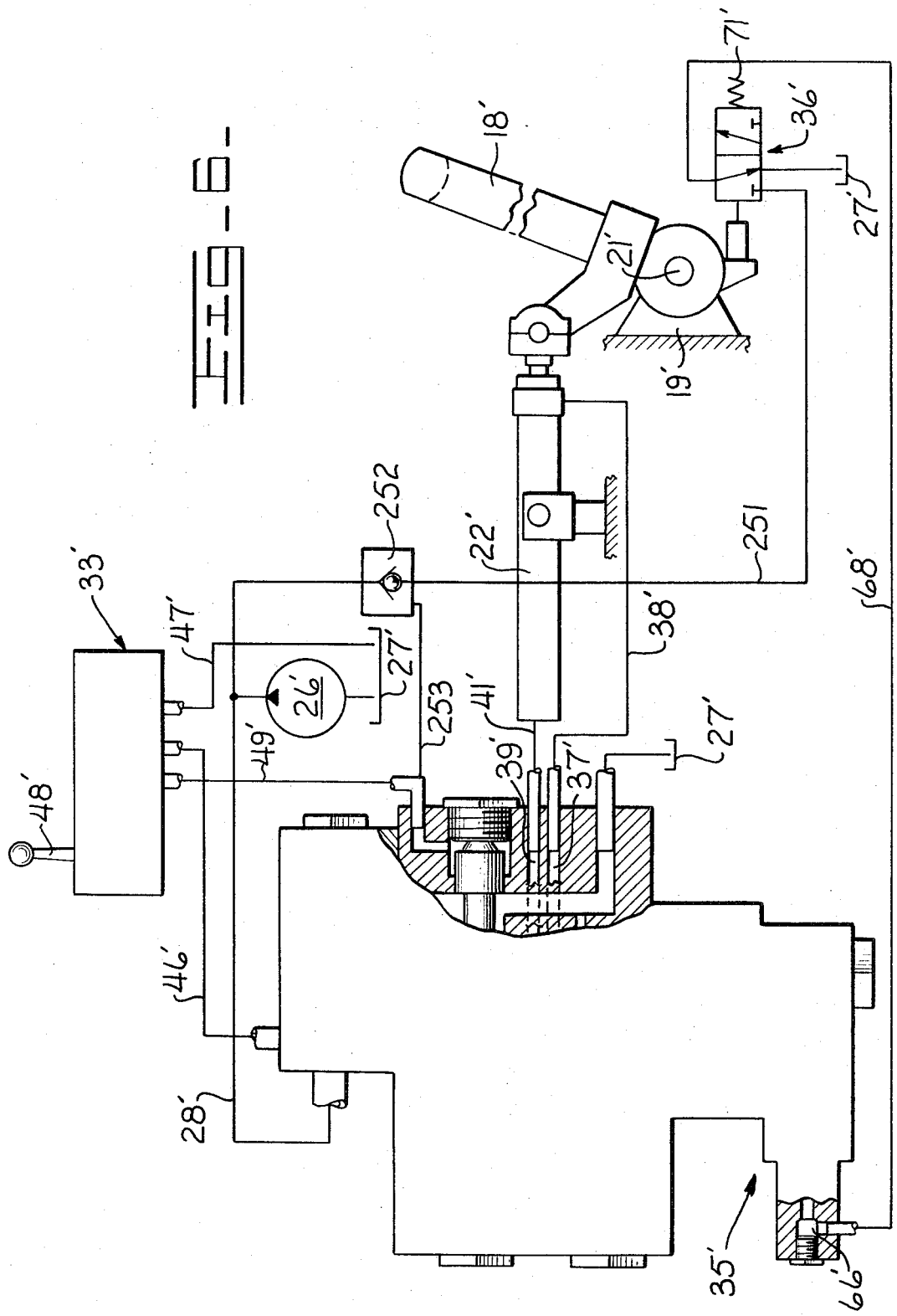

HYDRAULIC CONTROL CIRCUIT WITH REMOTELY CONTROLLED DUAL PRESSURE RELIEF VALVE

BACKGROUND OF THE INVENTION

The present invention relates to a hydraulic control circuit including a dual pressure relief valve which is operatively responsive to operating conditions of a hydraulic motor for providing actuating fluid to the motor at two pressure levels. More particularly, the circuit is employed to operate a push-pull coupling adapted for tandem operation of two vehicles.

A push-pull coupling of the type contemplated by the present invention is described in substantial detail within U.S. Pat. No. 3,434,738, issued Mar. 25, 1969, and assigned to the assignee of the present invention. Such push-pull couplings include a hook member on one vehicle and a latch member on another vehicle to permit rapid coupling and uncoupling for example of separate tractor-scraper units. Accordingly, two such scrapers may operate in tandem to employ the power of both vehicles during loading. After the scrapers are loaded, they may be rapidly uncoupled and operate independently during transport and unloading.

The latch member is preferably positioned by a double-acting hydraulic jack which operates in a first direction to urge the latch member into engagement with a hook on the other vehicle or in the opposite direction to retract the latch member. In common control circuit for such a jack, a pump or source of fluid continues to direct fluid under pressure toward the jack even when the latch means is in its retracted position. However, since substantially reduced fluid pressure is required to maintain the latch member in its raised position, it is desirable to provide means for lowering the operating pressure in order to avoid unnecessary operation of the pump against a relatively higher operating pressure.

Within the prior art, this problem has been partially solved by means of by-pass devices providing a relatively low operating pressure, for example 200 psi, when the vehicle engine is running at low idle and approximately 500 psi, for example, when the engine is operating at high idle. Such an arrangement, however, does not necessarily conform the relative operating pressure with operating requirements of the jack.

Another problem encountered within such couplings is that the jack may also be employed as a stop for positioning the latch member in a retracted position. Accordingly, any inadvertent movement of the latch member by external forces can result in severe damage to the jack or its mounting. One prior art solution to this particular problem has been the use of a mechanical stop secured to the vehicle frame in a position to abut the latch member when it is fully retracted. This solution creates another problem however, in that the retracted position of the latch member may vary from vehicle to vehicle or within a single vehicle during continued operation. Thus, operation of the jack for opening the by-pass device may not always correspond with the fully retracted position of the latch member. Accordingly, there remains a possibility that the pump will continue to work against the relatively higher pressure in the control circuit.

Additional control circuits or components employable within prior art circuits of the type discussed above include U.S. Pat. Nos. 3,469,861; 3,160,076; 3,416,561 and 2,905,190.

SUMMARY OF THE INVENTION

It is an object of the present invention to provide a dual pressure hydraulic control circuit for overcoming one or more problems of the type discussed above.

It is a more particular object of the present invention to provide a hydraulic control circuit for operating a double acting hydraulic motor, the circuit being operatively coupled with the motor to provide a relatively higher level of actuating fluid pressure during a selected operating condition of the motor.

A still further object of the invention is to adapt the hydraulic control circuit for operation of a push-pull coupling of a type suitable for permitting selective tandem operation of two vehicles.

Additional objects and advantages of the invention are made apparent in the following description having reference to the accompanying drawings.

BRIEF DESCRIPTION OF THE DRAWINGS

FIG. 1 is a fragmentary side view in elevation of two vehicles, each including portions of a push-pull coupling for permitting selective tandem operation of the vehicles.

FIG. 2 is a view including fragmentary portions of the push-pull coupling of FIG. 1 together with a control circuit constructed according to the present invention for operating the coupling.

FIGS. 3, 4, 5 and 6 represent views of control circuits similar to that of FIG. 2 while each illustrating variations of selected portions within the control circuit.

DESCRIPTION OF THE PREFERRED EMBODIMENTS

A push-pull coupling of the type described in greater detail in U.S. Pat. No. 3,434,738 and contemplated for operation by the present hydraulic control circuit is illustrated within FIG. 1 in combination with two vehicles, preferably tractor scrapers, which are thus adapted for selective tandem operation. The push-pull coupling indicated generally at 11 provides for rapid engagement and disengagement between the forward vehicle 12 and the rearward vehicle 13.

To briefly summarize construction of the push-pull coupling, the forward vehicle has a rearwardly disposed hook 14 and a push-pad 16. The rear vehicle 13 has a push block 17 arranged for engagement with the push pad 16 to permit pushing of the forward vehicle 12 by the rearward vehicle 13. This mode of operation would of course be employed for example when the forward vehicle or scraper 12 is being loaded under assistance of the rearward vehicle 13.

The rearward vehicle also has a latch or bail 18 which is pivotally connected to a frame portion 19 as indicated at 21. A double-acting hydraulic jack 22 regulates movement of the bail 18 between a position of engagement with the hook 14 as illustrated in FIG. 1 and a fully retracted position wherein the bail is arranged in a generally vertical position upon the vehicle 13. A stop block 23 is secured to the frame 19 of the vehicle 13 in a position to engage the bail 18 when it is in its fully raised or retracted position.

The present invention particularly contemplates a hydraulic control circuit for operating a double-acting hydraulic jack such as that indicated at 22 in FIG. 1.

However, it will be apparent from the following description that the hydraulic control circuit of the present invention may also be employed to operate double-acting hydraulic jacks or motors in other applications.

Referring now to FIG. 2, a fragmentary portion of the push-pull coupling 11 is included to particularly represent the combination of the bail 18 and the hydraulic jack 22. A hydraulic control circuit constructed according to the present invention for operating the jack 22 is generally indicated at 24 and includes a pump or source of fluid under pressure 26. The pump draws fluid from a common sump 27 and delivers it under pressure into a main conduit 28. The conduit 28 is in communication with an inlet conduit 29 of a control valve 31 by means of a pressure regulating valve 32.

The control valve 31 is selectively operable by a manually operated selector valve 33 to direct fluid under pressure to either the head or rod end of the hydraulic jack 22 while communicating the other end of the jack to a fluid drain indicated at 34 within the control valve 31. The fluid drain 34 is in communication with the common fluid sump 27.

A dual pressure relief valve 35 regulates the exhaust flow of fluid from the inlet passage 29 and normally establishes a relatively low operating pressure therein for actuating the jack 22. However, as is described in greater detail below, the dual pressure relief valve 35 is responsive to a pilot control valve 36 to selectively increase operating fluid pressure within the inlet passage 29. The pilot control valve 36 is in turn responsive to a selective operating condition of the jack 22 or bail 18 as is also described in greater detail below.

To describe the components of the control circuit in greater detail, the control valve 31 includes the pressure regulating valve 32 as noted above which diverts part of the fluid flow from the main conduit 28 to the manually controlled selector valve 33. The selector valve 33 is of a generally conventional type as described in greater detail for example within U.S. Pat. No. 3,618,984. The function of the selector valve 33 within the present control circuit 24 is described below.

The control valve 31 includes a first service port 37 which is connected to the rod end of the hydraulic jack 22 through a conduit 38. A second service port 39 is in communication with the head end of the jack 22 through another conduit 41.

The control valve 31 also has a spool 42 which is reciprocately arranged within a bore 43 to regulate fluid communication of the service ports 37 and 39 with the inlet passage 29 and the fluid drain 34. The spool 42 is normally positioned as shown in FIG. 2 by a spring 44 so that the inlet passage 29 is maintained in communication with the service port 37 and accordingly with the conduit 38. However, the spool 42 may be shifted leftwardly within the bore 43 by means of the manually actuated selector valve 33.

The selector valve 33 receives diverted fluid pressure from the main conduit 28 through a conduit 46 while another drain conduit 47 connects the selector valve to the sump 27. In the neutral position, the selector valve blocks communication through the conduit 46 with the drain conduit 47 being communicated with another conduit 49. Upon operation of the selector valve 33 for example by a manual control lever 48, fluid pressure from the conduit 46 is directed through the conduit 49 into a chamber 51 formed at the right end of the bore 43. Fluid pressure within the chamber 51 shifts the spool 42 against the spring 44 and thus communicates the inlet passage 29 with the second service port 39 and accordingly with the head end of the jack 22.

As noted above, pressurization within the inlet passage 29 is regulated by the dual pressure relief valve 34 which comprises a dump spool 52 slidably arranged within a bore 53 which is in open communication with the inlet passage 29. The dump spool 52 is normally urged upwardly by a spring 54 to close the inlet passage 29 from communication with a chamber 56 which opens to the fluid drain 34. A tubular portion 57 of the spool 52 has metering slots 58 formed therein to regulate fluid flow from the inlet passage 29 to the drain chamber 56. An orifice 59 is axially formed by a central portion of the spool 52 with fluid from the inlet passage 29 flowing therethrough to a balance chamber 61 which houses the spring 54. Pressure within the balance chamber 61 is established by a poppet valve 62 which is urged rightwardly, as viewed in FIG. 2, by a spring 63 and thus tends to close the balance chamber 61 from the drain chamber 56. Fluid pressure within the balance chamber 61 establishes a differential pressure across the orifice 59 which in turn determines the position of the spool 52 and establishes the rate of fluid flow from the inlet chamber 29 to the drain chamber 56.

A dual pressure function is provided within the relief valve 35 by a movable reaction piston 64 which provides a seat for the spring 63. With the reaction piston shifted to the left as viewed in FIG. 2, the spring 63 offers relatively limited resistance to opening movement of the poppet valve 62 with a relatively lower pressure thus being established in the balanced chamber 61 and the inlet passage 29.

Within the arrangement of the relief valve 35 as described above, the reaction piston 64 responds to pilot fluid within a chamber 66 by shifting rightwardly against a stop or shoulder 67 and thus increases reaction force of the spring 63 against the poppet valve 62. This in turn develops a relatively higher pressure within the balance chamber 61 and accordingly within the inlet passage 29. Actuating pilot fluid is selectively communicated to the chamber 66 through a conduit 68 by the pilot control valve 36. The valve 36 is in communication with a branch 69 of the conduit 38 and is normally positioned by a spring 71 to communicate the conduits 68 and 69.

The valve 36 also has a stem 72 which is arranged for engagement by a tab 73 secured to the bail 18. The valve 36 is arranged so that the tab 73 contacts the stem 72 and shifts the valve 36 against the spring 71 as the bail 18 approaches its fully retracted position which is illustrated in FIG. 2.

In operation, the control valve 31 tends to remain in the condition illustrated in FIG. 2 to direct fluid under pressure from the inlet passage 29 to the rod end of the jack 22 through the conduit 38. With the bail 18 in its fully retracted position, the valve 36 prevents fluid communication between the conduits 69 and 68 so that a relatively lower pressure is established within the inlet passage 29 by the relief valve 35. The bail 18 is shifted toward the engagement position illustrated in FIG. 1 by actuation of the selector valve 33 which causes the spool 42 to be shifted leftwardly and places the inlet passage 29 in communication with the service port 39 and the head end of the jack 22. Since the conduit 38 is in communication with drain through the control valve 31, there is insufficient pressure in the conduits 69 and 68 to shift the reaction piston from the position illustrated in FIG. 2. Thus, the relief valve 35 continues to establish a relatively low operating pressure within the inlet passage 29.

The push-pull coupling is unlatched by shifting the bail 18 from the position illustrated in FIG. 1 toward its retracted position illustrated in FIG. 2. This is accomplished by again shifting the selector valve 33 to evacuate the chamber 51 at the right end of the bore 43. The spool 42 is then returned to the position shown in FIG. 2 by the spring 44 so that actuating fluid from the inlet passage 29 is again communicated to the service port 37 and the conduit 38. With the bail 18 in the position illustrated in FIG. 1, the valve 36 is allowed to maintain communication between the conduits 69 and 68 so that the reaction piston 64 is shifted rightwardly to establish a relatively higher pressure within the balance chamber 61 and the inlet passage 29. The relatively higher pressure thus established is required for proper retraction of the bail 18 toward the elevated position illustrated in FIG. 2. As the bail approaches its retracted position, the tab 73 again contacts the stem 72 to shift the valve 36 and close communication between the conduits 69 and 68. Thus, fluid pressure within the chamber 66 is allowed to return to the sump 27 and the reaction piston 64 shifts leftwardly to the position of FIG. 2. Accordingly, the relatively lower operating pressure is again established within the balanced chamber 61 and the inlet passage 29.

The present invention also contemplates an additional feature to permit a controlled response of the jack 22 to external forces acting upon the bail 18 in order to protect various components of the coupling from damage. When the spool 42 is shifted leftwardly to communicate the inlet passage 29 with the head end of the jack 22 in order to engage the bail 18 with the hook 14 (See FIG. 1), the service port 37 is communicated with a drain passage 74, fluid communication from the fluid drain 34 to the passage 74 being regulated by a dual rate relief valve 76. The valve 76 includes a tubular shuttle valve 77 which is normally positioned against a spring 78 as viewed in FIG. 2. The shuttle valve 77 forms a pair of small orifices 79 which are normally positioned as shown to communicate the drain passage 74 with the fluid drain 34. When actuating fluid from the inlet passage 29 is communicated to the head end of the jack 22, fluid pressure in the rod end of the jack and in the conduit 38 enters the drain passage 74 and its fluid communication with the fluid drain 34 is normally regulated by the orifice 79 to limit the rate at which the bail 18 may be lowered.

Under certain conditions such as when the vehicles are coupled together as illustrated in FIG. 1, the bail 18 may be subjected to external forces tending to urge the bail 18 downwardly and to urge the jack 22 in extension. The increased pressure thus generated in the rod end of the jack is communicated through the conduit 38 and service port 37 into the drain passage 74. The increased pressure urges the shuttle valve 77 further to the left and opens a number of relatively large slots 81 into communication with the fluid drain 34. Thus, the bail 18 is allowed to be lowered at an increased rate in response to the external force in order to prevent damage to the jack 22.

Embodiment of FIG. 3

Another embodiment of a hydraulic control circuit according to the present invention is illustrated in FIG. 3 wherein components similar to those already described in FIG. 2 are indicated by similar primed numerals. The embodiment of FIG. 3 differs from that of FIG. 2 primarily by replacement of the pilot control valve as indicated at 101. The control valve 101 includes a valve body 102 which forms a bore 103 in communication with a plurality of axially spaced apart ports 104, 106, 107, 108, and 109. A spool 111 is reciprocally arranged within the bore 103 and is urged leftwardly therein by a spring 112. The port 104 is in communication with the conduit 41' and the head end of the jack 22 through a conduit 113. The port 106 is directly in communication with the inlet passage 29' by means of a separate conduit 114. The port 107 is in communication with the conduit 68' and the reaction chamber 66' of the dual pressure relief valve 35'. The two ports 108, and 109 are both in communication with the sump 27'.

A plunger 116 generally corresponds to the stem 72 of FIG. 2. The plunger acts upon the left end of the spool 111 and slidably penetrates the left end of the valve body 102 for abutting engagement with the tab 73'.

In operation, fluid pressure from the inlet conduit 29' is in continual communication with the pilot control valve 101 through the conduit 114. However, when the bail 18' is in its retracted position as illustrated in FIG. 3, the spool 111 blocks the inlet port 106 and thus the conduit 114 from communication with the outlet port 107. When the bail 18 is lowered toward its engagement position from the retracted position illustrated in FIG. 3, fluid pressure necessarily present within the conduit 41' is communicated into the left end of the bore 103 and thus tends to maintain the spool 111 in the rightwardly shifted position illustrated in FIG. 3. Thus, fluid communication between the inlet port 106 and outlet port 107 is blocked and the relief valve 35' continues to establish a relatively low operating pressure within the inlet passage 29'.

When the bail 18' is again retracted or raised from the position illustrated in FIG. 1 in a manner similar to that described above with reference to FIG. 2, the conduit 41' acts as a fluid drain and the pilot valve spool 111 is shifted leftwardly by its spring 112. Fluid pressure from the inlet passage 29' is then communicated to the reaction chamber 66' through the conduit 114, the port 106, the valve bore 103, the port 107 and the conduit 68'. Accordingly, the dual rate relief valve 35' responds to pressurization of the reaction chamber 66' in the same manner as described with reference to FIG. 2. It establishes a relatively higher pressure within the inlet passage 29' until the bail 18' approaches its fully retracted position and the tab 73' again causes the plunger 116 to shift the spool 111 to the right. The inlet port 106 is then again blocked by the spool 111 while the reaction chamber 66' is communicated to drain across the pilot control valve 101 and the relief valve 35' again reduces the operating pressure within the inlet passage 29'.

The Embodiment of FIG. 4

Another embodiment is illustrated in FIG. 4 wherein components similar to those described above with reference to FIG. 2 are again indicated by similar primed numerals. The embodiment of FIG. 4 differs from that of FIG. 2 as to the manner in which the reaction chamber 66' is pressurized in response to operation of the pilot control valve 36'. Within this embodiment, a separate shuttle spool 151 responds to fluid pressure from the pilot control valve 36' through the conduit 68' to communicate fluid from the inlet passage 29' to the reaction chamber 66'.

The shuttle spool 151 is reciprocally arranged within a bore 152 while being urged leftwardly therein by a spring 153. Fluid from the inlet passage 29' is in open communication with the bore 152 by means of a conduit 154 and an inlet port 156. The bore 152 is also in communication with the sump 27' by means of an outlet port 157 and a conduit 158. An additional port 159 communicates the bore 152 with the reaction chamber 66'.

In operation, the shuttle spool 151 tends to remain in a leftwardly shifted position within the bore 152 under the influence of the spring 153 until pilot fluid from the valve 36' is communicated through the conduit 68' to the left end of the bore 152. The shuttle spool 151 is then shifted rightwardly to communicate fluid pressure from the inlet passage to the reaction chamber 66'. While the shuttle spool 151 is in the leftward position illustrated in FIG. 4, the reaction chamber 66' is in communication with the sump 27'.

Another embodiment illustrated in FIG. 5 again employs components identified by primed numerals corresponding to numerical labels for similar components in the embodiment of FIG. 2. The FIG. 5 embodiment varies from that of FIG. 2 primarily in that a fluid signal is communicated to the pilot operating valve 36' from the main conduit 28' which receives output fluid directly from the pump 26'. Accordingly, a conduit 201 communicating the main conduit 28' with the pilot operating valve 36' replaces the conduit 69 of FIG. 2. Since relatively high pressure fluid is always present in the main conduit 28', the dual pressure relief valve 35' is modified from the valve 35 of FIG. 2 in order to limit response of the reaction piston 64' to fluid pressure communicated from the pilot control valve 36' through the conduit 68'.

A spring-loaded poppet 202 is disposed within a chamber 203 to normally close a passage 204 which communicates with the reaction chamber 66'. Fluid pressure from the first service port 37' is also communicated to the chamber 203 by means of a internal passage 206 and a conduit 207.

With this arrangement, fluid pressure from the conduit 68' entering the reaction chamber 66' is ineffective to shift the reaction piston 64' rightwardly unless the poppet 202 is urged into closing engagement with the passage 204 by fluid pressure in the chamber 203. Otherwise, any fluid pressure entering the reaction chamber 66' tends to escape through the passage 204 and across the poppet 202 before sufficient pressure is developed to move the reaction piston 64'. A restrictive orifice 208 is arranged between the reaction chamber 66' and the conduit 68' in order to restrict fluid flow thereacross when the bail 18' is being lowered. This feature allows continued functioning of the rest of the control circuit during that period.

Accordingly, the embodiment of FIG. 5 operates to establish pressurization of the inlet passage 29' in substantially the same manner in which the FIG. 2 embodiment establishes pressurization of its inlet passage 29.

The Embodiment of FIG. 6

Another embodiment of the present invention is illustrated in FIG. 6 with primed numerals again being employed to label those components corresponding to similar components in the embodiment of FIG. 2. The FIG. 6 embodiment corresponds generally to the FIG. 5 embodiment described above except that fluid under pressure is communicated to the pilot control valve 36' from the main conduit 28' through a conduit 251. The dual pressure relief valve 35' is unchanged from that of FIG. 2 while pressurization of the conduit 251 is intermittently interrupted by a pilot operated check valve 252 arranged between the main inlet conduit 28' and the conduit 251. A pilot signal for biasing the check valve 252 is provided by a branched conduit 253 in communication with the conduit 49'. Accordingly, fluid pressure from the main inlet conduit 28' is freely communicated to the pilot control valve 36' by means of the conduit 251 until the selector valve 33 is shifted to lower the bail 18'. At that time, fluid under pressure is communicated into the conduit 49' and a biasing signal is then communicated to the check valve 252. The check valve is thus conditioned to interrupt fluid communication from the main inlet conduit 28' into the conduit 251. The dual pressure relief valve 35' functions in response to the control valve 36' in order to provide increased operating pressure for retracting the bail 18' while otherwise providing relatively low operating pressure to the jack 22'.

We claim:

1. A hydraulic control circuit providing for dual pressure operation of a push-pull coupling between two vehicles which are selectively operable in tandem, the coupling including hook means on one vehicle and a latch member disposed on the other vehicle, a double-acting hydraulic jack regulating movement of the latch member between engagement and disengagement relative to the hook means, the control circuit comprising a source of fluid under pressure, a control valve having an inlet passage in communication with the source and a movable spool means for selectively communicating opposite ends of the jack with the inlet passage and a fluid drain respectively, a pilot operated, dual pressure relief valve communicating the inlet passage to drain, the relief valve normally establishing a relatively low fluid pressure within the inlet passage, and pilot control means operatively responsive to the position of the latch member and in communication with the relief valve, the pilot control means conditioning the pilot operated relief valve for establishing a relatively high fluid pressure within the inlet passage while the jack is being operated to disengage the latch member from the hook means, the pilot control means conditioning the pilot operated relief valve to establish the relatively low fluid pressure within the inlet passage as the latch member approaches a fully retracted position.

2. The control circuit of claim 1 wherein the dual pressure relief valve includes means responsive to a hydraulic pilot signal for establishing the relatively high fluid pressure, the pilot control means comprising a pilot valve for communicating the pilot signal to the hydraulically responsive means, the pilot valve being operatively coupled with the latch member to interrupt the pilot signal as the latch member approaches its fully retracted position.

3. The control circuit of claim 2 further comprising mechanical means operatively coupling the pilot valve with the latch member.

4. The control circuit of claim 2 wherein the dual pressure relief valve comprises a dump spool responsive to downstream pressure in a balance chamber for variably communicating the inlet passage to drain and establishing an operating fluid pressure therein, pressure in the balance chamber being established by a pilot operated poppet valve responsive to the pilot valve.

5. The control circuit of claim 2 comprising another dual rate relief valve for regulating the exhaust flow of fluid from one end of the jack when the jack is conditioned by the control valve for moving the latch member into engagement with the hook means.

6. The control circuit of claim 5 further comprising mechanical means operatively coupling the pilot valve with the latch member.

7. The control circuit of claim 1 wherein the dual pressure relief valve comprises a dump spool responsive to downstream pressure in a balance chamber for variably communicating the inlet passage to drain and establishing an operating fluid pressure therein, pressure in the balance chamber being established by a pilot operated poppet valve responsive to the pilot control means.

8. The control circuit of claim 7 further comprising mechanical means operatively coupling the pilot control means with the latch member.

9. The control circuit of claim 1 further comprising mechanical means operatively coupling the pilot control means with the latch member and the jack.

10. The control circuit of claim 1 wherein the pilot operated, dual pressure relief valve comprises reaction means conditioned by the pilot control means for establishing the relatively high operating fluid pressure within the inlet passage.

11. The control circuit of claim 10 wherein the reaction means is responsive to a hydraulic pilot signal from the pilot control means.

12. The control circuit of claim 10 wherein the reaction means is responsive to a fluid signal communicated thereto from the inlet passage under regulation of the pilot control means.

13. The control circuit of claim 10 further comprising mechanical means operatively coupling the pilot control means with the latch member and hydraulic jack.

* * * * *